UNITED STATES PATENT OFFICE.

ROBERT A. FISHER, OF PHILADELPHIA, PENNSYLVANIA, ASSIGNOR OF ONE-HALF TO G. T. LEWIS, OF SAME PLACE.

SIZING FOR PAPER-MAKERS.

SPECIFICATION forming part of Letters Patent No. 266,451, dated October 24, 1882.

Application filed September 29, 1882. (Specimens.)

*To all whom it may concern:*

Be it known that I, ROBT. A. FISHER, of Philadelphia, in the county of Philadelphia and State of Pennsylvania, have invented certain Improvements in Sizing for Paper-Makers; and I do hereby declare the following is a full, clear, and exact description, sufficient to enable one skilled in the art to practice my invention.

My invention consists in an improvement on the invention described in my application recently filed, (serial No. 72,733, of 1882;) and it consists, first, in a process for manufacturing a viscid or creamy aluminous sizing for paper-makers, and, secondly, in a viscid or creamy aluminous compound containing sodium or zinc for use by paper-makers as a sizing compound.

My invention does not contemplate any novelty in the preparation of a solution of aluminium sulphate, but in the subsequent treatment of such a solution obtained by any of the methods usually practiced.

Clay or any other proper aluminous mineral, or any artificially-prepared compound of aluminium, is first treated with sulphuric acid, according to one of the methods generally followed, to produce an acid solution of aluminium. If the aluminous material employed contains silica or other material insoluble in this acid solution, these are first allowed to settle, and the clear acid solution, having about a density of 26° Baumé, is then drawn off into suitable tanks or vessels. The next step is to neutralize a portion of the sulphuric acid contained in the acid solution of aluminium sulphate. This can be done by means of sodic or zincic oxide or zinc, either one of the three being put into the liquid at any temperature, but the warmer the liquid the sooner is the desired neutralization accomplished. The amount of neutralizing material required will depend upon the greater or less excess of acid in the acid solution of aluminium sulphate, and of course must be regulated by the judgment of the person conducting the operation. The solution is then concentrated in an evaporator properly heated. When the solution is evaporated to a density of about 37° Baumé, more or less, when boiling it is run into suitable coolers and allowed to cool to the temperature of about 120° Fahrenheit, when it is agitated while cooling down to about 80° Fahrenheit, after which the aluminous compound assumes and remains in a condition of viscid or creamy consistency, in which condition it is properly packed in vessels to be placed upon the market. Natural cooling and passing between rollers, which really produce an agitation or artificial arrangement of particles, will give the material the same creamy or viscid consistency as will evaporation to a considerable degree above 37° Baumé while boiling and running in cold water.

I do not confine myself to making the acid solution by means of sulphuric acid, as other acids which will attack aluminous minerals could be properly used and the same subsequent treatment followed; but I prefer the sulphuric acid on account of its cheapness.

The main feature of the invention is in preparing an acid solution of the compound and then neutralizing by some reagent, which will leave a portion of a zinc or sodium compound in the mixture.

Such a compound will be readily recognized as of great value by paper-makers, especially as tending to brighten aniline colors and utilize all the mass as sizing.

Having thus described my invention, what I claim as new, and desire to secure by Letters Patent, is—

1. The process of manufacturing a viscous aluminous compound for sizing for paper-makers, consisting essentially in first making an acid solution of aluminium sulphate, then neutralizing a portion of the acid contained in the solution by means of sodic or zincic oxide or zinc, next evaporating the resulting liquid to the required density, and then cooling under agitation, substantially as set forth.

2. As a new article of manufacture, a sizing for paper-makers consisting of an aluminous compound containing sodium or zinc, substantially as and for the purpose described.

R. A. FISHER.

Witnesses:
 H. B. APPLEWHAITE,
 R. K. EVANS.